(12) United States Patent
Hwang (10) Patent No.: US 9,643,572 B1
(45) Date of Patent: May 9, 2017

(54) METHOD AND APPARATUS FOR DETECTING INTRUSION INTO LARGE VEHICLE

(71) Applicant: HYUNDAI MOTOR COMPANY, Seoul (KR)

(72) Inventor: Soon Cheul Hwang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/958,495

(22) Filed: Dec. 3, 2015

(30) Foreign Application Priority Data

Oct. 29, 2015 (KR) ........................ 10-2015-0150741

(51) Int. Cl.
  *B60R 25/30* (2013.01)
  *G01S 7/539* (2006.01)
  *G01S 7/524* (2006.01)

(52) U.S. Cl.
  CPC .............. *B60R 25/30* (2013.01); *G01S 7/524* (2013.01); *G01S 7/539* (2013.01)

(58) Field of Classification Search
  CPC .......... G01S 15/66; G01S 15/87; G01S 15/88; G01S 7/4004; G01S 7/4052; G01S 7/527; G01S 7/536; G08B 29/183; G08B 13/1645; G08B 13/2491; G08B 13/04; G08B 13/1609

(Continued)

(56) References Cited

U.S. PATENT DOCUMENTS 3,813,669 A * 5/1974 Saunders ................ G01S 13/56
   327/44
3,832,709 A * 8/1974 Klein .................... G01S 13/348
   342/114

(Continued)

FOREIGN PATENT DOCUMENTS

JP    2001-264431 A    9/2001
JP    2002-251694 A    9/2002

(Continued)

OTHER PUBLICATIONS

Notice of Allowance issued in Korean Patent Application No. 10-2015-0150741 dated Oct. 19, 2016.

*Primary Examiner* — Fekadeselassie Girma
(74) *Attorney, Agent, or Firm* — McDermott Will & Emery LLP (57) ABSTRACT

A method for detecting a vehicle intrusion includes a first signal transmission process for alternately transmitting a first signal of a waveform through a first transmission module and a second transmission module at a predetermined period, a first intrusion determination process for analyzing a reflected wave received in response to the transmitted first signal to determine whether the intrusion occurred, a second signal transmission process for transmitting a second signal of a pulse waveform, upon detecting the intrusion as a result of the first intrusion determination process, a second intrusion determination process for analyzing a waveform of a reflected wave received in response to the transmitted second signal to determine whether the intrusion occurred, and transmitting a predetermined alarm message indicating that the intrusion occurred upon detecting the intrusion as a result of the second intrusion determination process.

17 Claims, 3 Drawing Sheets

(58) Field of Classification Search
USPC ......... 340/554, 541, 522, 552, 567, 426.24, 340/515, 426.1, 426.18, 426.26, 508, 517, 340/539.11, 539.17
See application file for complete search history.

(56) References Cited

U.S. PATENT DOCUMENTS

| | | | | |
|---|---|---|---|---|
| 3,838,408 | A * | 9/1974 | McMaster | G08B 13/1627 340/501 |
| 4,697,184 | A * | 9/1987 | Cheal | G01S 13/56 340/554 |
| 4,857,912 | A * | 8/1989 | Everett, Jr. | G08B 19/00 340/508 |
| 5,093,656 | A * | 3/1992 | Dipoala | G01S 7/4052 340/515 |
| 5,200,735 | A * | 4/1993 | Hines | G08B 25/10 340/539.11 |
| 5,422,626 | A * | 6/1995 | Fish | G08B 25/10 340/3.41 |
| 6,457,364 | B1 * | 10/2002 | Howell | G01S 7/527 340/426.28 |
| 9,135,474 | B2 * | 9/2015 | Vega | G06F 21/86 |
| 2001/0035837 | A1 * | 11/2001 | Fullerton | G01S 7/003 342/28 |
| 2002/0060639 | A1 * | 5/2002 | Harman | G01S 13/56 342/28 |
| 2005/0099273 | A1 * | 5/2005 | Shimomura | B60R 25/1004 340/426.1 |
| 2005/0231353 | A1 * | 10/2005 | DiPoala | G08B 13/2494 340/522 |
| 2006/0217063 | A1 * | 9/2006 | Parthasarathy | H04B 1/0003 455/39 |
| 2008/0165001 | A1 * | 7/2008 | Drake | G08B 29/24 340/550 |
| 2009/0040046 | A1 * | 2/2009 | Browning, Jr. | G08B 13/186 340/552 |
| 2010/0201518 | A1 * | 8/2010 | Green | G08B 13/2494 340/554 |
| 2011/0090042 | A1 * | 4/2011 | Leonard | G05B 15/02 340/5.1 |
| 2011/0141283 | A1 * | 6/2011 | Lee | G01S 15/526 348/152 |
| 2012/0087211 | A1 * | 4/2012 | Lee | G08B 13/1609 367/93 |
| 2012/0319844 | A1 * | 12/2012 | van Doorn | G01S 13/003 340/541 |
| 2013/0077442 | A1 * | 3/2013 | Hersey | G01S 7/536 367/99 |
| 2013/0113647 | A1 * | 5/2013 | Sentelle | G01S 13/32 342/22 |
| 2013/0286783 | A1 * | 10/2013 | Sussman | G01S 3/8083 367/93 |
| 2013/0335219 | A1 * | 12/2013 | Malkowski | G08B 13/22 340/539.22 |
| 2014/0063257 | A1 * | 3/2014 | Katuri | G01S 13/003 348/152 |
| 2014/0177393 | A1 * | 6/2014 | Menne | G01S 15/00 367/89 |
| 2014/0232536 | A1 * | 8/2014 | Uda | G01S 15/523 340/426.24 |
| 2015/0166010 | A1 * | 6/2015 | Kyung | B60R 25/302 340/426.24 |
| 2015/0166011 | A1 * | 6/2015 | Lee | G01S 15/04 340/426.26 |
| 2016/0129839 | A1 * | 5/2016 | Kim | H04N 5/2254 348/148 |

FOREIGN PATENT DOCUMENTS

| | | |
|---|---|---|
| JP | 2015-530302 A | 10/2015 |
| KR | 10-2002-0053011 A | 7/2002 |
| KR | 10-1068721 B1 | 9/2011 |
| KR | 10-1143986 B1 | 5/2012 |
| KR | 10-1265468 B1 | 5/2013 |
| KR | 10-2014-0101902 A | 8/2014 |
| KR | 10-1461923 B1 | 11/2014 |
| KR | 10-2015-0059983 A | 6/2015 |
| WO | 2014/072972 A1 | 5/2014 |

* cited by examiner

METHOD AND APPARATUS FOR DETECTING INTRUSION INTO LARGE VEHICLE

CROSS REFERENCE TO RELATED APPLICATION

This application claims the benefit of priority to Korean Patent Application No. 10-2015-0150741, filed on Oct. 29, 2015 with the Korean Intellectual Property Office, which is hereby incorporated by reference as if fully set forth herein.

TECHNICAL FIELD

The present disclosure relates to a vehicle intrusion detection method, and more particularly, to a method and apparatus for detecting an intrusion into a large vehicle and for detecting an illegal intrusion into a large vehicle using an ultrasonic signal.

BACKGROUND

In general, an intrusion detection system of a vehicle can detect illegal intrusion into a vehicle by irradiating an ultrasonic signal in a vehicle through a transmitting end and converting ultrasonic waves into an electrical signal and analyzing a signal level of the electrical signal upon detecting ultrasonic waves colliding with and reflected by an object at a receiving end.

Such an indoor intrusion detection system for a vehicle detects scattering, that is, the Doppler effect due to movement of an intruder and an object, determines whether an intrusion occurs, and generates an alarm according to the determination result in the case of vehicle intrusion.

The vehicle intrusion detection system for a vehicle is mainly operated in a door locked state in which the vehicle is not driven.

Conventionally, an indoor space of a general sedan is not large, and thus it is possible to detect an entire area using an ultrasonic sensor including one ultrasonic transmitter and one ultrasonic receiver.

However, in the case of a vehicle with a large internal space, such as a bus, there is a problem in that vehicle intrusion cannot be completely detected using only an ultrasonic sensor including one ultrasonic transmitter and one ultrasonic receiver. Accordingly, conventionally, a plurality of ultrasonic sensors are installed in a vehicle so as to detect vehicle intrusion.

However, when the number of ultrasonic sensors increases, there is a problem in that vehicle manufacturing costs increase and current consumption in a vehicle standby state is increased.

SUMMARY OF THE DISCLOSURE

Accordingly, the present disclosure is directed to a method and apparatus for detecting intrusion in a large vehicle that substantially obviates one or more problems due to limitations and disadvantages of the related art.

An object of the present disclosure is to provide a method and apparatus for detecting intrusion in a large vehicle.

Another object of the present disclosure is to provide a method and apparatus for detecting intrusion in a large vehicle, for minimizing the number of ultrasonic sensors installed in a vehicle to reduce manufacturing costs and dark current consumption.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

The present disclosure provides a method and apparatus for detecting intrusion in a large vehicle.

To achieve these objects and other advantages and in accordance with the purpose of the disclosure, as embodied and broadly described herein, a method for detecting vehicle intrusion includes a first signal transmission process for alternately transmitting a first signal of a waveform through a first transmission module and a second transmission module at a predetermined period, a first intrusion determination process for analyzing a reflected wave received in response to the transmitted first signal to determine whether intrusion occurs, a second signal transmission process for transmitting a second signal of a pulse waveform, upon detecting intrusion as a result of the first intrusion determination process, a second intrusion determination process for analyzing a waveform of a reflected wave received in response to the transmitted second signal to determine whether intrusion occurs, and transmitting a predetermined alarm message indicating that vehicle intrusion occurs upon detecting intrusion as a result of the second intrusion determination process.

The method may further include identifying a transmission module detecting intrusion according to a transmitted pulse waveform among the first transmission module and the second transmission module upon detecting intrusion as a result of the first intrusion determination process.

Only the identified transmission module may be activated and the second signal may be transmitted through the activated transmission module.

A waveform of the received reflected wave may be an analog waveform, and whether intrusion occurs may be determined based on amplitude change of the received reflected wave in the first intrusion determination process and the second intrusion determination process.

A waveform of the received reflected wave may be an analog waveform, and whether intrusion occurs may be determined based on frequency change of the received reflected wave in the first intrusion determination process and the second intrusion determination process.

At least one of transmission periods corresponding to the first signal and the second signal and transmission time periods of the first signal and the second signal during the transmission periods may be set to be different.

The method may further include performing control to change directed directions of the first transmission module and the second transmission module during the first signal transmission process, wherein, upon detecting intrusion in the first intrusion determination process, the change in the directed directions is stopped and the second signal is transmitted at a time point of intrusion detection.

The first signal and the second signal may each be an ultrasonic signal.

In another aspect of the present disclosure, a vehicle intrusion detection apparatus includes a pulse generator for generating a pulse waveform signal with a predetermined transmission period, first and second transmission modules for amplifying and transmitting the generated pulse waveform signal, a reception module for receiving a reflected wave received in response to the transmitted pulse waveform signal, and a controller for performing control to alternately transmit the pulse waveform signal through the first and second transmission modules at a predetermined period and for determining whether intrusion occurs based on change in a waveform of the received reflected wave.

The vehicle intrusion detection apparatus may further include a switch for performing control to transmit the generated pulse waveform signal by any one of the first transmission module and the second transmission module according to control of the controller.

The determination of whether intrusion occurs may include a first intrusion determination process and a second intrusion determination process, and in the first intrusion determination process, upon detecting intrusion, the controller may identify a transmission module detecting intrusion according to a transmitted pulse waveform among the first transmission module and the second transmission module.

The controller may perform control to transmit the pulse waveform signal through only the identified transmission module to perform the second intrusion determination process.

The vehicle intrusion detection apparatus may further include a communication unit for communicating with an external apparatus, wherein the controller may analyze a waveform of a reflected wave received in the second intrusion determination process to determine whether intrusion occur, and as a result of the second intrusion determination process, upon detecting intrusion, a predetermined alarm message indicating that intrusion occurs may be transmitted to a vehicle control device through the communication unit.

The controller may differently set at least one of transmission periods of the pulse waveform signal transmitted in the first intrusion determination process and the second intrusion determination process and transmission time periods of the pulse waveform signal during the transmission periods.

The pulse waveform signal may be an ultrasonic signal.

The received reflected wave may be an analog signal, and the reception module may include a receiver for receiving the analog signal, an amplifier for amplifying the received analog signal, a filter for filtering the amplified analog signal, and an analog-to-digital converter for converting the filter analog signal to a digital signal.

The waveform of the received reflected wave may be an analog waveform, and the controller may determine whether intrusion occurs based on at least one of amplitude change and frequency change of the received reflected wave.

In another aspect of the present disclosure, a vehicle including a vehicle intrusion detection apparatus including a pulse generator for generating a pulse waveform signal with a predetermined transmission period, first and second transmission modules for amplifying and transmitting the generated pulse waveform signal, a reception module for receiving a reflected waveform received in response to the transmitted pulse waveform signal, and a controller for performing control to alternately transmit the pulse waveform signal through the first and second transmission modules at a predetermined period and for determining whether intrusion occurs based on change in a waveform of the received reflected wave, and a vehicle control device for transmitting an intrusion alarm upon receiving a predetermined control signal indicating that intrusion is detected from the vehicle intrusion detection apparatus.

Two vehicle intrusion detection apparatuses may be installed at one side of an internal portion of the vehicle.

In another aspect of the present disclosure, a computer readable recording medium having recorded thereon a program for executing the aforementioned vehicle intrusion detection methods.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Reference will now be made in detail to the preferred embodiments of the present disclosure, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present disclosure are described as integrated into a signal one or to be operated as a signal one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

Figure 1:
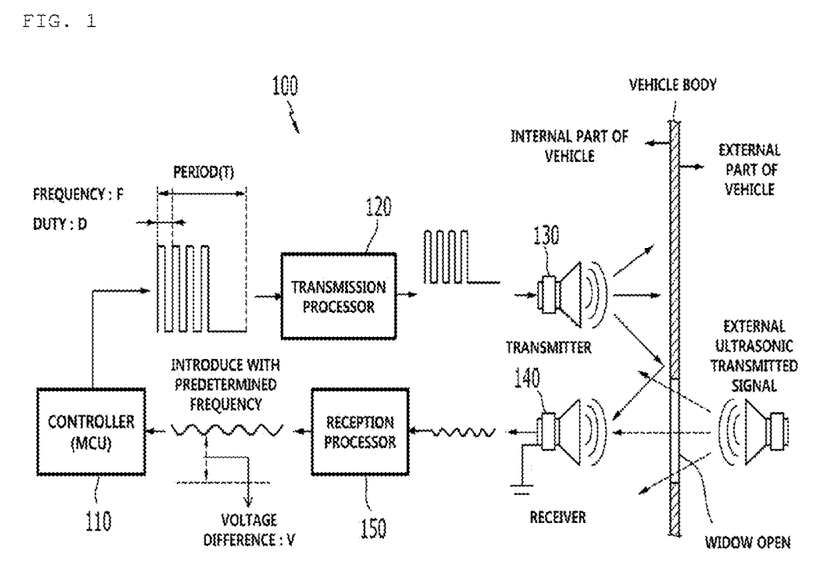
FIG. 1 is a diagram of a structure of a vehicle intrusion detection system according to the prior art.

FIG. 1 is a diagram of a structure of a vehicle intrusion detection system 100 according to the prior art.

Referring to FIG. 1, the vehicle intrusion detection system 100 according to the prior art may include a controller 110, a transmission processor 120, a transmitter 130, a receiver 140, and a reception processor 150.

Upon entering a vehicle intrusion detection mode in a vehicle door locked state, the controller 110 may generate a transmitted ultrasonic signal of a pulse waveform with a predetermined period for ultrasonic transmission.

The transmission processor 120 may amplify and process the transmitted ultrasonic signal of the pulse waveform, received according to a command of the controller 110.

The transmitter 130 may transmit the ultrasonic signal of the pulse waveform, amplified by the transmission processor 120, to an internal part of the vehicle.

The receiver 140 may receive an ultrasonic signal reflected by an object in the vehicle. In this case, the ultrasonic signal reflected by the object may have an analog waveform.

The reception processor 150 may process the ultrasonic signal introduced from the receiver 140 through a predetermined amplifying circuit and a filter and transmit the ultrasonic signal to the controller 110.

The controller 110 may perform a control to analyze frequency change and amplitude change of the signal waveform introduced from the receiver 140 to determine whether vehicle intrusion occurs, and generate a predetermined intrusion alarm according to the detection result.

That is, when a moving object is present in the vehicle, the controller 110 may perform a control to analyze waveform changes of a received signal due to the Doppler effect generated according to movement of the object, and as the analysis result, when the waveform change amount exceeds a predetermined reference value, the controller 110 may perform a control to generate an intrusion alarm.

As illustrated in FIG. 1, the vehicle intrusion detection system installed in a conventional vehicle may be configured and operated with one ultrasonic transmitter and one ultrasonic receiver as a set.

Figure 2:
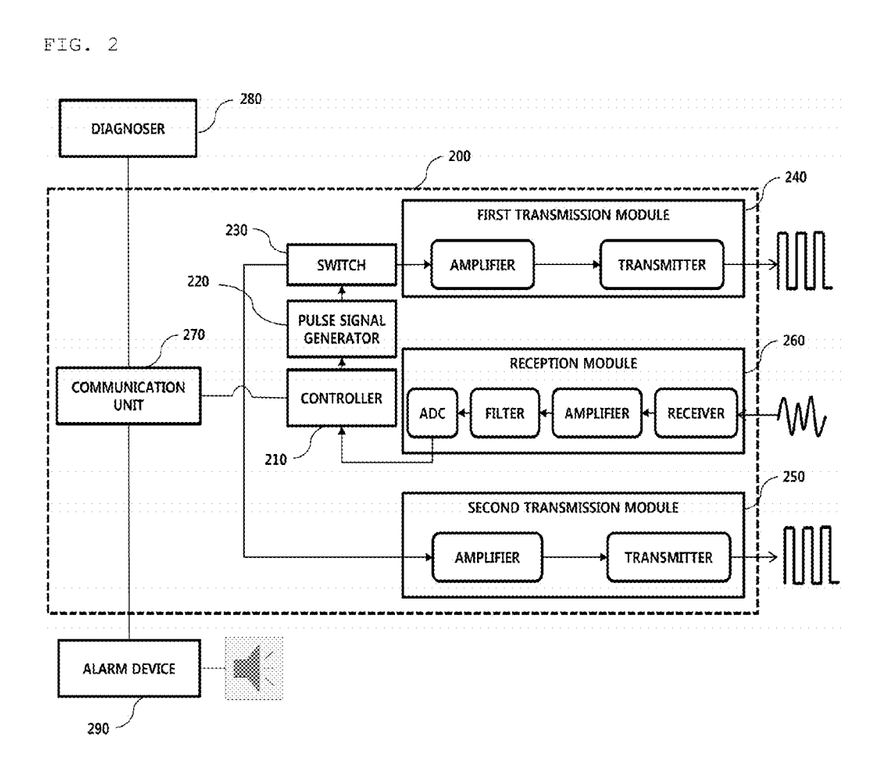
FIG. 2 is a block diagram of a structure of a vehicle intrusion detection apparatus according to an embodiment of the present disclosure.

FIG. 2 is a block diagram of a structure of a vehicle intrusion detection apparatus 200 according to an embodiment of the present disclosure.

Referring to FIG. 2, the vehicle intrusion detection apparatus 200 may include a controller 210, a pulse signal generator 220, a switch 230, a first transmission module 240, a second transmission module 250, a reception module 260, and a communication unit 270.

The controller 210 may control an overall operation of the vehicle intrusion detection apparatus 200.

In particular, the controller 210 may control the switch 230 to alternately transmit the ultrasonic signal of the pulse waveform generated by the pulse signal generator 220 through the first transmission module 240 and the second transmission module 250 at a predetermined period.

In addition, the controller 210 may determine whether a vehicle intrusion occurs based on waveform changes of the ultrasonic signal received through the reception module 260, generate a predetermined control signal so as to generate a predetermined intrusion alarm according to the determination result, and transmit the predetermined intrusion alarm to a predetermined alarm device 290 through the communication unit 270. Here, the communication unit 270 may perform local interconnect network (LIN) communication but this is merely an embodiment. Thus according to another embodiment of the present disclosure, controller area network (CAN) communication, Ethernet communication, FlexRay communication, and so on may be used. In addition, the alarm device 290 may be, but is not limited to, a body control module. Here, the body control module may correspond to one central control apparatus obtained by integrating a plurality of electronic control units (ECUs) applied to various apparatuses of a vehicle. The body control module may operate an alarm device based on a predetermined control signal from the controller 210 to transmit a visual and/or acoustic alarm around the vehicle.

The controller 210 according to another embodiment of the present disclosure may perform control to alternately transmit the internally generated ultrasonic signal of the pulse waveform to the first transmission module 240 and the second transmission module 250 at a predetermined period without control of a separate switch 230 using a timer (not shown) included in the controller 210.

The first transmission module 240 and the second transmission module 250 may each include an amplifier for amplifying the ultrasonic signal of the pulse waveform received through the switch 230 and a transmitter for transmitting the amplified ultrasonic signal of the pulse waveform to an internal part of the vehicle.

The reception module 260 may include a receiver for receiving an analog signal that is reflected and received by an object in the vehicle, an amplifier for amplifying the analog signal received by the receiver, a filter for filtering the amplified analog signal, and an analog-to-digital converter (ADC) for converting the filtered analog signal into a digital signal. Here, it may be noted that an order of the amplifier and the filter may be reversed. That is, the filtered analog signal may be amplified and transmitted to an ADC.

The reception module 260 according to an embodiment of the present disclosure may include a receiver for receiving an analog signal received and reflected by an object in the vehicle, an amplifier for amplifying the analog signal received by the receiver, and an envelope detector for detecting an envelope of the amplified analog signal and transmitting the envelope to the controller 210.

The pulse signal generator 220 may generate a pulse signal with a predetermined duty cycle or frequency at a predetermined period and transmit the pulse signal to the switch 230 according to a control signal of the controller 210. For example, the pulse signal generator 220 may generate a pulse signal with a length of 1 ms at a period of 10 ms and transmit the pulse signal to the switch 230 but this is merely an embodiment. Thus, it is noted that the length and transmission period of the pulse signal may be differently applied based on an experimental value for each type of a target vehicle.

The controller 210 may analyze the signal waveform received through the reception module 260 to determine whether intrusion occurs during transmission of the ultrasonic signal of the pulse waveform. In general, a reflected wave received by the reception module 260 includes only a coupling wave that is reflected and fed back irrespective of movement of an object in the vehicle when there is no vehicle intrusion, and thus the reflected wave may be a signal without any change compared with a pre-interpreted reflected wave. On the other hand, a reflected wave that is reflected and fed back by an object when there is vehicle intrusion may correspond to a synthesized wave of a coupling signal and a signal reflected by the intruding object (or human).

For example, whether an intrusion occurs may be performed, or determined, via two processes.

In a first intrusion determination process, the controller 210 may determine an area of the vehicle, into which intrusion occurs, based on amplitude of the received signal. For example, when an amplitude of a signal received during transmission of an ultrasonic signal of a pulse waveform through the first transmission module 240 is changed by a predetermined reference value or more, the controller 210 may determine whether an intrusion occurs into an area of the vehicle, which is covered by the first transmission module 240. On the other hand, when an amplitude of a signal received during transmission of an ultrasonic signal of a pulse waveform through the second transmission module 250 is changed by a predetermined reference value or more, the controller 210 may determine whether an intrusion occurs into an area of the vehicle, which is covered by the second transmission module 250. Here, a signal as a determination reference of the controller 210 may be an output signal of an analog digital converter of the reception module 260.

In the first intrusion determination process, upon detecting intrusion, the controller 210 may enter a second intrusion determination process for executing a boost mode.

In the second intrusion determination process, the controller 210 may transmit a pulse waveform with a shorter period than a transmission period of the pulse waveform transmitted in the first intrusion determination process. In addition, the controller 210 may set a signal sampling period for analysis of the reflected wave received in the second intrusion determination process as a shorter sampling period than the signal sampling period in the first intrusion determination process. In addition, the controller 210 may set a greater time period for transmitting an ultrasonic signal of a pulse waveform for a unit period in the second intrusion determination process than that of the first intrusion determination process.

Thus, according to the present disclosure, a transmission period may be controlled to be increased in order to minimize dark current consumption before a first intrusion is detected and controlled to be as short as possible when an intrusion is detected, thereby preventing vehicle battery discharge.

The controller 210 according to an embodiment of the present disclosure may transmit a predetermined control signal to the alarm device 290 so as to output different alarms according to intrusion detection in the first intrusion determination process and the second intrusion determination process. For example, the controller 210 may perform a control to transmit a higher, or louder, alarm according to intrusion detection in the second intrusion determination process than an alarm according to intrusion detection in the first intrusion determination process.

The controller 210 according to an embodiment of the present disclosure may control directed directions of the first transmission module 240, the second transmission module 250, and the reception module 260 according to a predetermined control signal received from a diagnoser 280. To this end, it is noted that an adjuster including a driving motor installed therein for adjusting the directed directions of the first transmission module 240, the second transmission module 250, and the reception module 260 may be further installed inside or outside the vehicle intrusion detection apparatus 200.

The controller 210 according to another embodiment of the present disclosure may control the directed directions of the first transmission module 240, the second transmission module 250, and the reception module 260 with a predetermined time period to enlarge an intrusion detection area during the first intrusion determination process. Upon detecting an intrusion, the controller 210 may fix a current directed direction and then perform the second intrusion determination process.

The vehicle intrusion detection apparatus 200 of FIG. 2 may be advantageous to primarily enlarge a detection range and also be advantageous to secondarily minimize dark current consumption. Accordingly, when a vehicle intrusion detection apparatus according to the present disclosure is installed in a large vehicle such as a bus, it is advantageous that only two vehicle intrusion detection apparatuses may be installed so as to detect illegal intrusion into the large vehicle.

In addition, a vehicle intrusion detection apparatus according to the present disclosure may detect the same area using a lower number of intrusion detection sensors than those of a conventional large vehicle, thereby reducing manufacturing costs.

Figure 3:
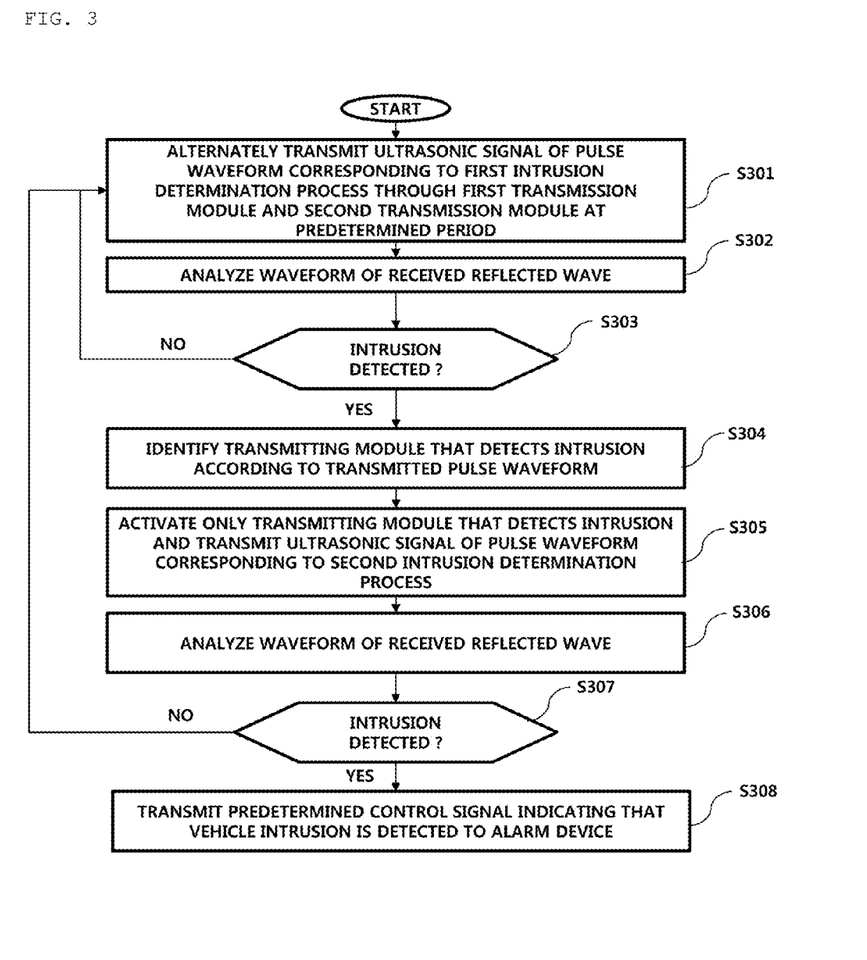
FIG. 3 is a flowchart of a vehicle intrusion detection method according to an embodiment of the present disclosure.

FIG. 3 is a flowchart of a vehicle intrusion detection method according to an embodiment of the present disclosure.

Referring to FIG. 3, a vehicle intrusion detection apparatus may perform a control to alternately transmit an ultrasonic signal of a pulse waveform generated during the first intrusion determination process to the first transmission module 240 and the second transmission module 250 at a predetermined period (S301).

For example, the vehicle intrusion detection apparatus may perform a control to generate a pulse waveform of a length of 1 ms at a period of 10 m and to alternately transmit the generated pulse waveform to the first transmission module 240 and the second transmission module 250.

The vehicle intrusion detection apparatus may analyze a reflected wave received through the reception module 260 to determine whether an intrusion occurs (S302 to S303).

As the determination result, upon detecting an intrusion in the first intrusion determination process, the vehicle intrusion detection apparatus may identify a transmitting module that detects an intrusion according to the transmitted pulse waveform (S304).

The vehicle intrusion detection apparatus may activate only the transmitting module that detects an intrusion in operation 303 above to enter the second intrusion determination process—i.e., a boost mode—(S304). For example, upon detecting an intrusion during a pulse waveform transmitting period of the first transmission module 240, the vehicle intrusion detection apparatus may activate (On) the first transmission module 240 and deactivate (Off) the second transmission module 250.

The vehicle intrusion detection apparatus may activate only the transmission module that detects an intrusion and generate and transmit an ultrasonic signal of a pulse waveform corresponding to the second intrusion determination process (S305).

The vehicle intrusion detection apparatus may analyze a waveform of a reflected wave during transmission of the ultrasonic signal of the pulse waveform corresponding to the second intrusion determination process to determine whether an intrusion occurs based on the analysis result (S306 to S307).

As the determination result of operation 307 above, upon detecting an intrusion, the vehicle intrusion detection apparatus may transmit a predetermined control signal indicating that a vehicle intrusion is detected to an alarm device (S308).

As the determination result of operation 307 above, upon determining that an intrusion does not occur, the vehicle intrusion detection apparatus may return to operation 301 above.

In the embodiment of FIG. 3, it is noted that transmission of periods of the ultrasonic signal of the pulse waveform corresponding to the first intrusion determination process and the ultrasonic signal of the pulse waveform corresponding to the second intrusion determination process and a transmission time period during one period may be set to be the same or different.

In addition, in the embodiment of FIG. 3, a sampling period and a sampling data collecting time period for analysis of a reflected wave received in the first intrusion determination process and a sampling period and a sampling data collecting time period for analysis of a reflected wave received in the second intrusion determination process may be set to be different. For example, the sampling period in the second intrusion determination process may be set to be shorter than that of the first intrusion determination process, and the sampling data collecting time period in the second intrusion determination process may be set to be longer than that of the first intrusion determination process, but the present disclosure is not limited thereto.

The method and apparatus according to the present disclosure may achieve the following advantages.

The present disclosure is advantageous in providing a method and apparatus for detecting an intrusion into a large vehicle.

The present disclosure is advantageous in providing a method and apparatus for detecting an intrusion into a large vehicle, for minimizing the number of ultrasonic sensors installed in the vehicle to reduce manufacturing costs and dark current consumption.

The present disclosure is advantageous in providing a method and apparatus for detecting an intrusion of a large vehicle, for maximizing an intrusion detection area per ultrasonic sensor.

In addition, it is advantageous to apply the present disclosure to a system for detecting an illegal intrusion into a wide area using an ultrasonic sensor as well as to a vehicle.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for detecting a vehicle intrusion, the method comprising:
   a first signal transmission process for alternately transmitting a first signal of a waveform through a first transmission module and a second transmission module at a predetermined period;
   a first intrusion determination process for analyzing a reflected wave received in response to the transmitted first signal to determine whether the intrusion occurred;
   a second signal transmission process for transmitting a second signal of a pulse waveform, upon detecting the intrusion as a result of the first intrusion determination process;
   a second intrusion determination process for analyzing a waveform of a reflected wave received in response to the transmitted second signal to determine whether the intrusion occurred; and
   transmitting a predetermined alarm message indicating that the intrusion occurred upon detecting the intrusion as a result of the second intrusion determination process.

2. The method according to claim 1, further comprising identifying a transmission module detecting the intrusion according to a transmitted pulse waveform among the first transmission module and the second transmission module upon detecting the intrusion as a result of the first intrusion determination process.

3. The method according to claim 2, wherein only the identified transmission module is activated and the second signal is transmitted through the activated transmission module.

4. The method according to claim 1, wherein a waveform of the received reflected wave is an analog waveform; and
   whether the intrusion occurred is determined based on an amplitude change of the received reflected wave in the first intrusion determination process and the second intrusion determination process.

5. The method according to claim 1, wherein a waveform of the received reflected wave is an analog waveform; and
   whether the intrusion occurred is determined based on a frequency change of the received reflected wave in the first intrusion determination process and the second intrusion determination process.

6. The method according to claim 1, wherein at least one of transmission periods corresponding to the first signal and the second signal and transmission time periods of the first signal and the second signal during the transmission periods is set to be different.

7. The method according to claim 1, further comprising performing a control to change directed directions of the first transmission module and the second transmission module during the first signal transmission process,
   wherein, upon detecting the intrusion in the first intrusion determination process, the change in the directed directions is stopped and the second signal is transmitted at a time point of the intrusion detection.

8. The method according to claim 1, wherein the first signal and the second signal are each an ultrasonic signal.

9. A vehicle intrusion detection apparatus, comprising:
   a pulse generator for generating a pulse waveform signal with a predetermined transmission period;
   first and second transmission modules for amplifying and transmitting the generated pulse waveform signal;
   a reception module for receiving a reflected wave received in response to the transmitted pulse waveform signal;
   a communication processor for communicating with an external apparatus; and
   a controller for performing a control to alternately transmit the pulse waveform signal through the first and second transmission modules at a predetermined period and for determining whether an intrusion occurred based on a change in a waveform of the received reflected wave, wherein the determination, by the controller, of whether the intrusion occurred, comprises a first intrusion determination process and a second intrusion determination process, and in the first intrusion determination process, upon detecting the intrusion, the controller identifies a transmission module related to the occurred intrusion and activates only the identified transmission module to transmit the pulse waveform signal through only the identified transmission module and performs the second intrusion determination process and analyzes a waveform of a reflected wave received in the second intrusion determination process to determine whether the intrusion occurred, and in the second intrusion determination process, upon detecting the intrusion, the controller transmits a predetermined alarm message, indicating that the intrusion occurred, to a vehicle controller through the communication processor.

10. The vehicle intrusion detection apparatus according to claim 9, further comprising a switch for performing a control to transmit the generated pulse waveform signal by any one of the first transmission module and the second transmission module according to a control of the controller.

11. The vehicle intrusion detection apparatus according to claim 9, wherein the controller differently sets at least one of transmission periods of the pulse waveform signal transmitted in the first intrusion determination process and the second intrusion determination process and transmission time periods of the pulse waveform signal during the transmission periods.

12. The vehicle intrusion detection apparatus according to claim 9, wherein the pulse waveform signal is an ultrasonic signal.

13. The vehicle intrusion detection apparatus according to claim 9, wherein the received reflected wave is an analog signal; and the reception module comprises a receiver for receiving the analog signal, an amplifier for amplifying the received analog signal, a filter for filtering the amplified analog signal, and an analog-to-digital converter for converting the filter analog signal to a digital signal.

14. The vehicle intrusion detection apparatus according to claim 9, wherein the waveform of the received reflected wave is an analog waveform; and the controller determines whether the intrusion occurred based on at least one of an amplitude change and a frequency change of the received reflected wave.

15. A vehicle, comprising:

a vehicle intrusion detection apparatus comprising, a pulse generator for generating a pulse waveform signal with a predetermined transmission period, first and second transmission modules or amplifying and transmitting the generated pulse waveform signal, a reception module for receiving a reflected waveform received in response to the transmitted pulse waveform signal, a communication processor for communicating with an external apparatus, and a controller for performing a control to alternately transmit the pulse waveform signal through the first and second transmission modules at a predetermined period and for determining whether an intrusion occurred based on a change in a waveform of the received reflected wave; and a vehicle controller for transmitting an intrusion alarm upon receiving a predetermined control signal indicating that the intrusion is detected from the vehicle intrusion detection apparatus, wherein the determination, by the controller, of whether the intrusion occurred comprises a first intrusion determination process and a second intrusion determination process, and in the first intrusion determination process, upon detecting the intrusion, the controller identifies a transmission module related to the occurred intrusion and activates only the identified transmission module to transmit the pulse waveform signal through only the identified transmission module and performs the second intrusion determination process and analyzes a waveform of a reflected wave received in the second intrusion determination process to determine whether the intrusion occurred; and in the second intrusion determination process, upon detecting the intrusion, the controller transmits a predetermined alarm message, indicating that the intrusion occurred, to the vehicle controller through the communication processor.

16. The vehicle according to claim 15, wherein two vehicle intrusion detection apparatuses are installed at one side of an internal portion of the vehicle.

17. A non-transitory computer readable recording medium having recorded thereon a program for executing the method of claim 1.

* * * * *